Dec. 20, 1966 J. A. BLUISH ETAL 3,293,538
MEANS FOR CONTROLLING A SIGNAL MODIFIER AS A FUNCTION
OF THE MAGNITUDE OF AN UNMODIFIED A.C. SIGNAL INPUT
Filed Nov. 19, 1962 3 Sheets-Sheet 3

INVENTORS
JOSEPH A. BLUISH
NATHANIEL N. MOORE
BY Herbert L. Davis
ATTORNEY

United States Patent Office 3,293,538
Patented Dec. 20, 1966

3,293,538
MEANS FOR CONTROLLING A SIGNAL MODIFIER AS A FUNCTION OF THE MAGNITUDE OF AN UNMODIFIED A.C. SIGNAL INPUT
Joseph A. Bluish, Elizabeth, and Nathaniel N. Moore, Wayne, N.J., assignors to The Bendix Corporation, Teterboro, N.J., a corporation of Delaware
Filed Nov. 19, 1962, Ser. No. 238,501
4 Claims. (Cl. 323—9)

This invention relates to a novel means for controlling a signal modifier as a function of the magnitude of an A.C. signal input and more particularly to such a control means for effectively preventing objectionable aircraft responses to sudden large transient command signals effective through an automatic flight control system and to a novel control means for a signal modifier of a type disclosed and claimed in U.S. Patent No. 2,955,215 granted October 4, 1960 to Theodore Eisen, Marvin Masel, and Louis Joseph Franchi, and assigned to The Bendix Corporation.

The need for the aforenoted control means has arisen in connection with the design of new automatic flight control systems for existing or proposed new aircraft wherein excessive roll rates which have heretofore been found objectionable to passenger comfort may be produced by sudden large command signals. These large command signals may be caused by the engagement of a mode of automatic flight, by commands created by human pilot control action, or by exterior forces on the aircraft.

Present methods provide a satisfactory solution for the engagement condition, but do not provide a solution for transients or large commands which occur due to pilot action or exterior forces after the initial ramp build up or linear increase in potential to the command modifier limits. While other methods investigated may provide an overall solution to the large command problem, such other methods have been found to provide stability problems in the control system or become difficult to mechanize.

An object of the invention, therefore, is to provide a novel means for controlling a signal modifying system for changing one form of a command signal to another form in response to the magnitude of the A.C. signal output from a controlling automatic pilot system.

Another object of the invention is to provide novel means for affecting the automatic flight control of a command modifier as a function of the controlling A.C. signal magnitude.

Another object of the invention is to provide a novel controller for a signal modifying system for effectively changing one form of command signal to another form suitable for use in high speed aircraft control systems operating in response to the magnitude of an unmodified A.C. signal supplied by the automatic pilot system.

The invention contemplates modifying an alternating current control signal by providing a shaped direct current voltage effective in response to and upon the magnitude of the controlling current exceeding a predetermined value to impress on the alternating current signal the characteristics of the direct current voltage whereupon the direct current voltage gates or limits an alternating current output control signal in a predetermined manner.

These and other objects and features of the invention are pointed out in the following description in terms of the embodiment thereof which is shown in the accompanying drawings. It is to be understood, however, that the drawings are for the purpose of illustration only and are not a definition of the limits of the invention, reference being had to the appended claims for this purpose.

Figure 1:
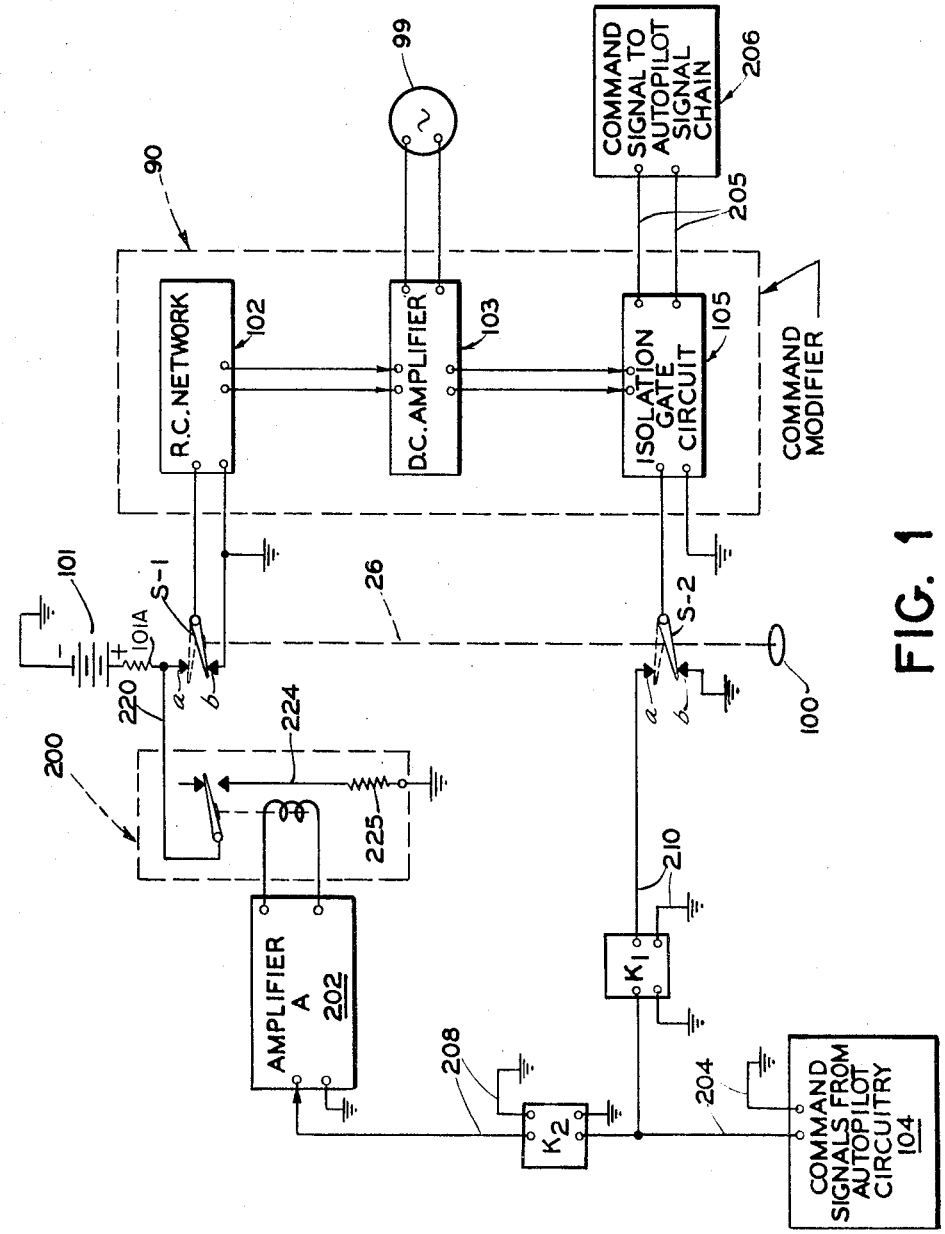
FIGURE 1 is a block diagram of a control command signal modifier system embodying the present invention.

Referring to the drawing of FIGURE 1, a direct current voltage from a source 101 may be applied through a resistor 101A to the input of a shaping R.C. network 102 of a command modifier 90 upon the controller switches S–1 and S–2 being adjusted to a dotted line upper position, as illustrated therein, by suitable operation of the operator-operative control 100.

The shaped direct current, as explained in the aforenoted U.S. Patent No. 2,955,215, may then be amplified to a desirable level by an amplifier 103 connected to the output of a shaping network 102 and having applied thereto an A.C. reference votlage 99, as explained in the aforenoted patent. Further, with switch S–2 closing contact "a," the output of amplifier 103 and the alternating current signal source 104 may be operatively connected to the gate circuit 105. The direct current voltage as applied to the gate circuit 105 by amplifier 103 modifies the control signal from source 104 by proportionately limiting the signal at the output of gate circuit 105. The signal at the output of the gate circuit 105 is limited in accordance with the amplitude and shape of the direct current voltage from amplifier 103, as explained in the aforenoted patent.

The feature of the present invention, as distinguished from the structure shown in the aforenoted U.S. Patent No. 2,955,215, resides in the unique use of the command modifier 90 of a type such as shown in the aforenoted patent with a relay 200 and amplifier 202 and the novel arrangement and relation thereof in the system with the command modifier 90.

Figure 2:
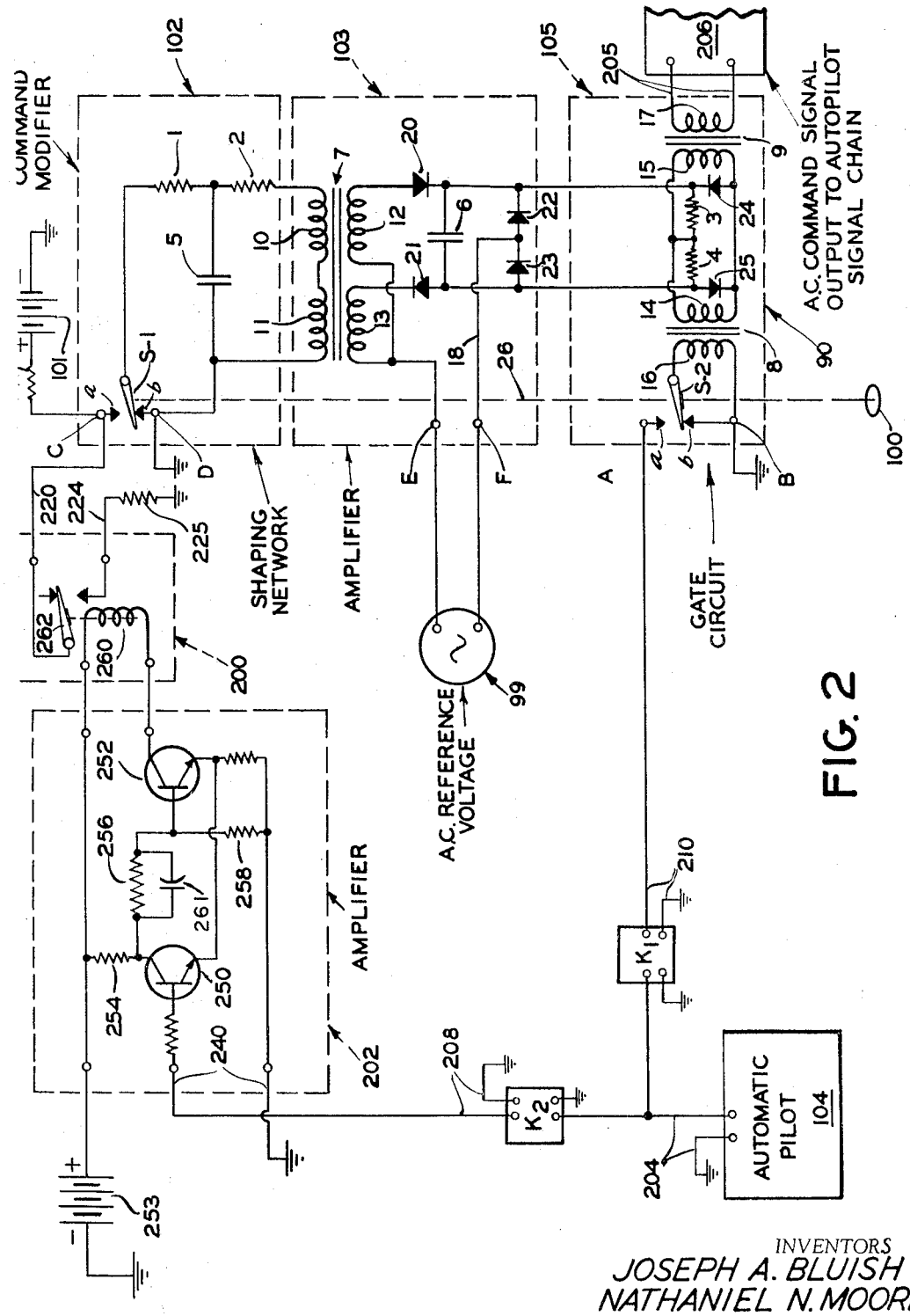
FIGURE 2 is a schematic wiring diagram of the block diagram of FIGURE 1.

In the novel arrangement of the present invention, an A.C. command input signal applied to conductors 204 is derived from external signal inputs to the control system provided by an automatic pilot system 104, shown schematically in FIGURES 1 and 2. These external signals may be generated in a compass system, in flight instrument systems, a Doppler navigation system, a radio navigation system, or other external associated systems.

The command modifier A.C. output signal on lines 205 is in turn applied to the automatic pilot signal chain 206 and mixed with other control system signals controlling the aircraft. The command modifier 90 may be of a type described and claimed in the aforenoted U.S. Patent No. 2,955,215 so as to provide a device which modifies an A.C. control signal applied at the gate circuit 105 as a function of D.C. control voltage applied to the R.C. network 102. Energization of the relay 200 is controlled through the amplifier 202 so as to selectively open and close a control circuit for the command modifier 90 as a function of the magnitude of the A.C. signal input to the amplifier 202.

In the operation of the system shown by the block diagram of FIGURE 1, the switches S–1 and S–2 are shown in the lower *b* position prior to operative engagement of the automatic pilot whereupon the command signal input fed through the automatic pilot circuitry of FIGURE 1 may be of a relatively large magnitude due to existing errors before operative engagement of the automatic pilot.

Figure 3:
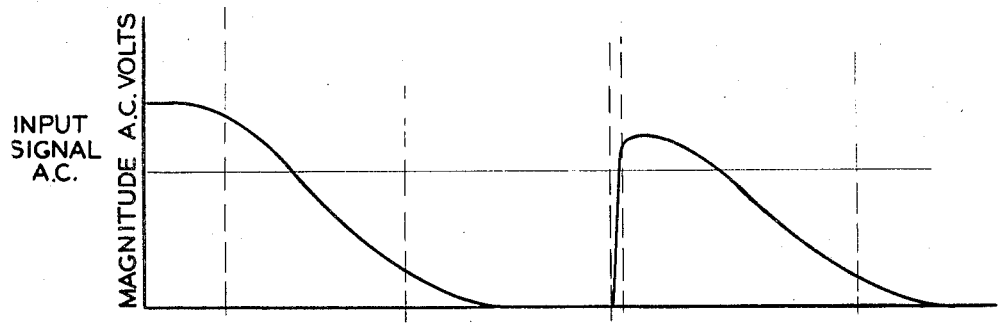
FIGURE 3 is a curve illustrating operating characteristics of the command signal input to the automatic pilot circuitry of FIGURE 2 and showing that such signal may be of a large magnitude at $t_0$ such as may be due to existing errors before operative engagement of the automatic pilot has been effected, by human pilot control action or by exterior forces on the aircraft.

This operative condition is shown at $t_0$ on the curve of FIGURE 3 whereupon the resulting A.C. command signal may be fed through the automatic pilot output conductors 204, shown in FIGURE 1, into the circuitry of the gain networks of blocks K–1 and K–2. The circuitry of the blocks K–1 and K–2 may be conventional resistor divider networks arranged so as to provide the proper gain adjustments so that proper magnitude A.C. signals appear on output conductors 208 and 210 leading therefrom. However, switch S–2 in the lower *b* position does not allow the A.C. voltage on conductors 210 to be introduced into the command modifier 90. Switch S–2 in the *b* position also grounds the input to the command modifier 90 and consequently there is no A.C. output across wires 205 into the signal chain 206 of the automatic pilot.

Further, while the A.C. signal voltage on conductor 208 is fed into the amplifier 202, the amplifier 202 performs no direct function at this time although energization therethrough may effect the relay 200 so as to cause the relay 200 to open a connection between conductors 220 and 224 upon the A.C. signal input level exceeding a predetermined value.

Switch S–1 in the lower *b* position provides a ground to the command modifier D.C. circuit leading to the shaping network 102. This ground holds the command modifier limit at zero by grounding the input to the R.C. network 102.

Figure 4:
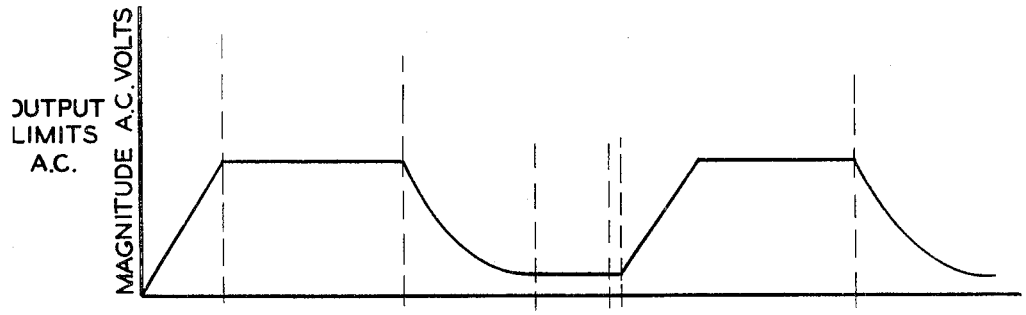
FIGURE 4 is a curve illustrating the A.C. output limits effected by the invention and that when the A.C. input signal to the automatic pilot circuitry of FIGURE 2 reaches the value at $t_5$ on the curve of FIGURE 3, the command modifier control means of the present invention causes the output limits to recycle as shown beginning at $t_5$ of the curve of FIGURE 4.

However, upon engagement of the flight mode of operation of the automatic pilot 104, the switches S–1 and S–2 may be actuated by the pilot through the operator-operative means 100 so as to move the switches S–1 and S–2 to the upper *a* positions. Thereupon the switch S–2 allows the A.C. signal applied across the output lines 210 of the gain adjustment network K–1 to be fed into the command modifier 90 while the switch S–1 on adjustment to the upper *a* position removes the ground from the R.C. network 102 and connects the R.C. network 102 to the line 220 controlled by the relay 200. The conductors 220 and 224 to the relay 200 on being opened by the relay 200 permit the D.C. voltage applied by source 101 to build up in the R.C. network 102 which in turn permits the output across output conductors 205 of the command modifier 90 to build up, as shown from $t_0$ to $t_1$ on the curve of FIGURE 5. The output limits of the command modifier 90 during this period are shown on the curve of FIGURE 4.

At $t_1$ the output across conductors 205 of the modifier 90 has attained its output limit and the A.C. output signal applied thereby remains at this magnitude as long as the input signal applied across the lines 208 exceeds this value. When the A.C. input signal applied across the lines 208 decreases sufficiently, the A.C. output signal applied across the lines 205 begins to decrease proportionately until both are very small. At $t_2$ the A.C. signal input to the amplifier 202 has decreased to the point where the amplifier 202 causes the relay 200 to close the connection between the conductors 220 and 224. This puts a resistor 225 in series to ground with the R.C. network 102, as shown in FIGURES 1 and 2, resulting in a lower value of D.C. voltage on the R.C. network 102. Thereupon the output limit at the output lines 205 of the modifier 90 reduces to the value shown at $t_3$ on the curve of FIGURE 4. The A.C. output signal across the lines 205, as shown at $t_3$ of FIGURE 5, is less than this value so no effect is reflected in the A.C. output across the lines 205.

Figure 5:
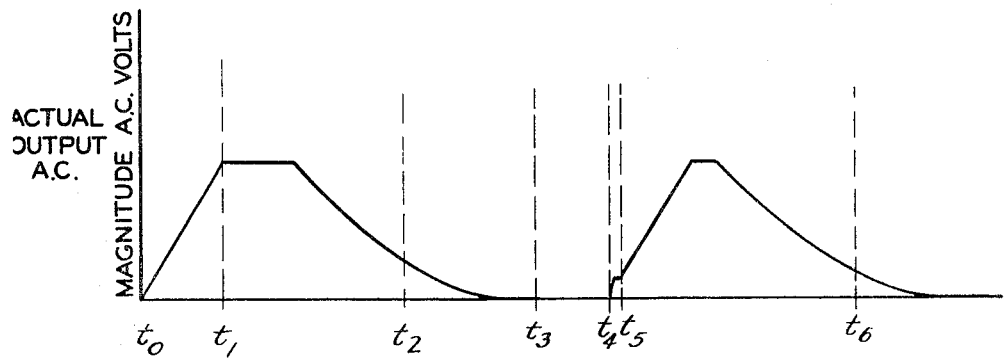
FIGURE 5 is a curve illustrating operating characteristics of the A.C. output signal and showing that, during the recycling operation illustrated with reference to the curve of FIGURE 4, the output signal is reduced to the low value illustrated at $t_6$.

If a large transient signal is imposed on conductors 204 such as at $t_4$ on the curve of FIGURE 3, the A.C. output of the modifier 90 across the lines 205 would respond only to the magnitude of the smaller limit as shown at $t_4$ on the curve of FIGURE 5. When the A.C. input across the conductors 208 reaches the value at $t_5$ on the curve of FIGURE 3, the amplifier 202 causes the relay 200 to open the connection between conductors 220 and 224 allowing the output limits to recycle as shown at the beginning of $t_5$ on the curve of FIGURE 4. The A.C. output across the lines 205 thereupon increases, as shown in the curve of FIGURE 5.

The operation continues the same as previously described and the output is reduced to the lower value again as shown at $t_6$ of FIGURE 5. This cycle can be repeated as required by large command signal variations. The magnitude of the command modifier 90 limits, the ramp rate, and the relay amplifier operation points are all adjustable to accommodate the requirements of the particular aircraft type.

The foregoing operation, as explained with regard to the block diagrams of FIGURE 1, is also applicable to the circuitry shown by the wiring diagram of FIGURE 2 for the several parts thereof in which the several elements of the command modifier 90 bear corresponding numerlas to those parts explained in greater detail in the aforenoted U.S. Patent No. 2,955,215, and because of the description in the patent, it is not deemed necessary to repeat such description herein.

The amplifier 202 may be of a conventional Schmitt Trigger or other suitable type. In the amplifier 202, as shown in FIGURE 2, the transistor 250 may be so arranged as to be nonconductive upon a signal voltage below a predetermined critical low value being applied across the lines 208 and thereby to input lines 240 of the amplifier 202.

Thereupon the base of transistor 252 may be biased by the D.C. voltage applied by D.C. source 253 through a voltage divider consisting of resistors 254, 256, and 258 so that the transistor 252 may be conductive so as to cause electrical energy supplied by D.C. source 253 to effectively energize the winding 260 of the relay 200 causing in turn the relay switch element 262 to be biased into a position to close a connection between conductors 220 and 224.

However, as the voltage across the input lines 240 exceeds the aforementioned predetermined critical low value, a critical voltage is reached whereupon the transistor 250 begins to conduct and thereupon regeneratively turn off the transistor 252 through the action of a regenerative circuit including the resistor 256 and capacitor 261. If the input voltage across the input lines 240 is now lowered below the aforenoted critical value, the transistor 250 again becomes nonconductive and the transistor 252 will again conduct so as to effect the energization of the winding 260.

It will be seen from the aforenoted circuitry that, depending upon the signal voltage applied from an automatic pilot 104 and across the lines 204 exceeding a predetermined value, the lines 220 and 224 will be opened whereas upon the critical voltage decreasing below the predetermined value, the conductors 224 and 220 will be connected by the operation of the relay switch 262 upon energization of the relay winding 260 so as to connect resistor 225 across the input to the R.C. network 102 to effect the aforenoted desired operation, heretofore explained with reference to the block digaram of FIGURE 1.

Although only one embodiment of the invention has been illustrated and described, various changes in the form and relative arrangement of the parts, which will now appear to those skilled in the art may be made without departing from the scope of the invention. Reference is, therefore, to be had to the appended claims for a definition of the limits of the invention.

What is claimed is:

1. In a signal modifying system of a type including a source of direct current voltage, a shaping network, means for connecting said source of direct current voltage to said network for shaping the voltage, an alternating current source for supplying a signal of varying magnitude, and a gating circuit connected to said signal source and to the shaping network and controlled by the voltage from the shaping network for modifying said alternating current signal in accordance with the voltage from the shaping network; the improvement comprising electrical triggering means responsive to the magnitude of the alternating current signal, and relay means operated by said triggering means upon the alternating current signal exceeding a predetermined magnitude to vary the direct current voltage applied to the shaping network through said connecting means so as to limit the alternating current signal to a predetermined magnitude.

2. In a signal modifying system of a type including a source of direct current voltage, a shaping network, means for connecting said source of direct current voltage to said network for shaping the voltage, an alternating current source for supplying a signal of varying magnitude, and a gating circuit connected to said signal source and to the shaping network and controlled by the voltage from the shaping network for modifying said alternating current signal in accordance with the voltage from the shaping network; the improvement comprising relay means responsive to the magnitude of the alternating current signal, a circuit for shunting said source of direct current voltage controlled by said relay means, and said relay means rendering said shunting circuit ineffective upon the alternating current signal exceeding a predetermined magnitude so as to cause an increase in the direct current voltage applied to the shaping network and thereby limit the magnitude of the signal to a predetermined value.

3. In a signal modifying system of a type including a shaping circuit adapted to receive a direct current voltage to shape the voltage in a predetermined manner, and a gating circuit adapted to receive an alternating current signal of varying magnitude, said gating circuit being operatively connected to said shaping circuit and controlled by the shaped voltage for modifying the alternating current signal in accordance therewith; the improvement comprising first means responsive to the magnitude of the alternating current signal, and second means operated by the first means to increase the direct current voltage applied to said shaping circuit upon the alternating current signal exceeding a predetermined magitude.

4. In a signal modifying system of a type including a shaping circuit adapted to receive a direct current voltage to shape the voltage in a predetermined manner, a gating circuit having an input adapted to receive an alternating current signal of varying magnitude and having an output, and rectifying means connected between the input and the output and connected to the shaping circuit and receiving the shaped voltage and providing an alternating current signal at the output in accordance with the shaped voltage; the improvement comprising relay means responsive to the magnitude of the alternating current signal at the input, a circuit controlled by said relay means for shunting the direct current voltage from said input, and said relay means rendering said shunting circuit effective upon the alternating current signal at the input to said gating circuit decreasing below a predetermined magnitude to thereupon decrease the direct current voltage applied to the shaping network, and said relay means rendering said shunting circuit ineffective upon the alternating current signal at the input to said gating circuit increasing above a predetermined magnitude so as to cause the direct current voltage applied to the shaping network to be effectively increased and thereby limit the alternating current signal applied at the output of the gating circuit to a predetermined magnitude.

References Cited by the Examiner
UNITED STATES PATENTS

| 2,858,433 | 10/1958 | Rector | 250—77 |
| 3,173,078 | 3/1965 | Farnsworth | 323—9 |
| 3,207,975 | 9/1965 | Pintell | 323—22 |

JOHN F. COUCH, *Primary Examiner.*

LLOYD McCOLLUM, *Examiner.*

K. D. MOORE, *Assistant Examiner.*